*J. W. Faulkner,*
*Horseshoe.*
Nº 53,801.          Patented Apr. 10, 1866.
Fig. 1
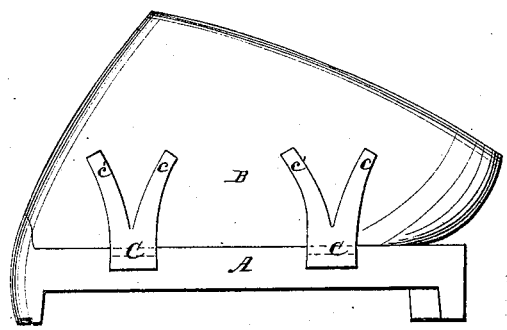
Fig. 2.
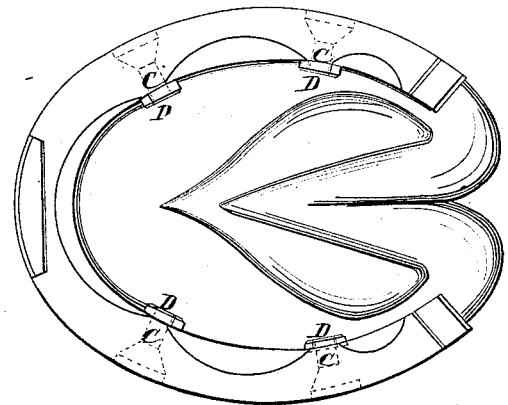
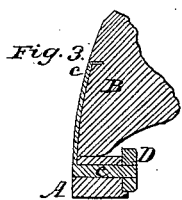  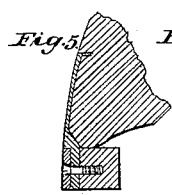 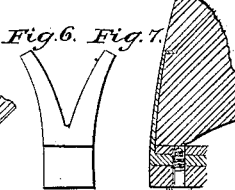 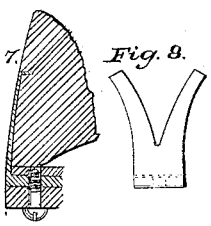 
Fig. 3.   Fig. 4.   Fig. 5.   Fig. 6.   Fig. 7.   Fig. 8.
Witnesses:                          Inventor:

UNITED STATES PATENT OFFICE.

JOSEPH W. FAULKNER, OF ROCKFORD, ILLINOIS.

IMPROVEMENT IN HORSESHOES.

Specification forming part of Letters Patent No. 53,801, dated April 10, 1866.

*To all whom it may concern:*

Be it known that I, JOSEPH W. FAULKNER, of Rockford, in the county of Winnebago and State of Illinois, have invented a new and useful Improvement in Horseshoes, of which the following is a full, clear, and exact description, reference being had to the accompanying drawings, which make part of this specification, and in which—

Figure 1 represents a side elevation of my improved shoe; Fig. 2, a bottom view of the same; Fig. 3, a section through the same at the line 1 1 of Fig. 4, and Fig. 4 a view of the clip detached. Figs. 5, 6, 7, and 8 represent two modes of fastening the clip to the shoe not claimed in this application.

My invention relates to that class of horseshoes which are attached to the foot without the use of nails passing through the hoof; and the improvement herein claimed consists, first, in attaching the shoe to the hoof by forked or bifurcated spring-clips; second, in uniting the spring draw-clip to the shoe by inserting it into an inclined transverse perforation, so that as the nut is tightened the shoe is drawn up to the hoof.

In the accompanying drawings, a shoe, A, of suitable construction, is shown as connected to the hoof B by curved forked spring-clips C, having the upper ends of their prongs $c$ $c'$ bent in about at right angles, to hold the shoe to the hoof. The base $c^2$ of the clip is bent inward, also nearly at a right angle, and inserted into a transverse slot or perforation in the shoe. The base of the clip tapers inwardly and fits snugly into the slot, and its inner end is rounded and has a screw-thread cut on it to receive a nut, D, by which the clip is drawn to the hoof.

By causing the slot to incline from the outer to the inner side of the shoe the shoe will be tightened on the hoof as it is drawn up. The nuts may also be partially countersunk in the shoe. It is obvious that the shoe and clips might be made of wrought-iron, malleable iron, or steel.

It will thus be seen that by my invention I leave the bottom of the shoe entirely unobstructed, that I place the nuts where they are readily accessible and where they are protected from injury, and that I secure a strong, light, and simple fastening, which will readily permit the shoe to be removed or replaced.

Figs. 5 and 6 show a clip inserted vertically into a slot in the shoe and held by a screw from the outside, and Figs. 7 and 8 a clip like Fig. 4, but held by a screw passing vertically through the shoe and clip. Neither of these two devices are, however, claimed under this patent.

In attaching the shoe to the hoof I use four clips, which are countersunk into the hoof so as to hold securely, and drawn up by tightening the nuts.

What I claim as my invention, and desire to secure by Letters Patent, is—

1. The bifurcated spring-clips with two prongs, constructed, arranged, and operating as described, for the purposes set forth.

2. The combination of the spring draw-clip with the shoe by means of the transverse slot and screw-nut, so that as the clip is drawn to the shoe the shoe is tightened upon the hoof.

In testimony whereof I have hereunto subscribed my name.

JOSEPH W. FAULKNER.

Witnesses:
J. I. PEYTON,
EDM. F. BROWN.